Dec. 1, 1942.    R. ROSSBACHER    2,303,956
APPARATUS FOR RIGHT AND LEFT-HAND DUPLICATING
Filed July 17, 1941    2 Sheets-Sheet 1
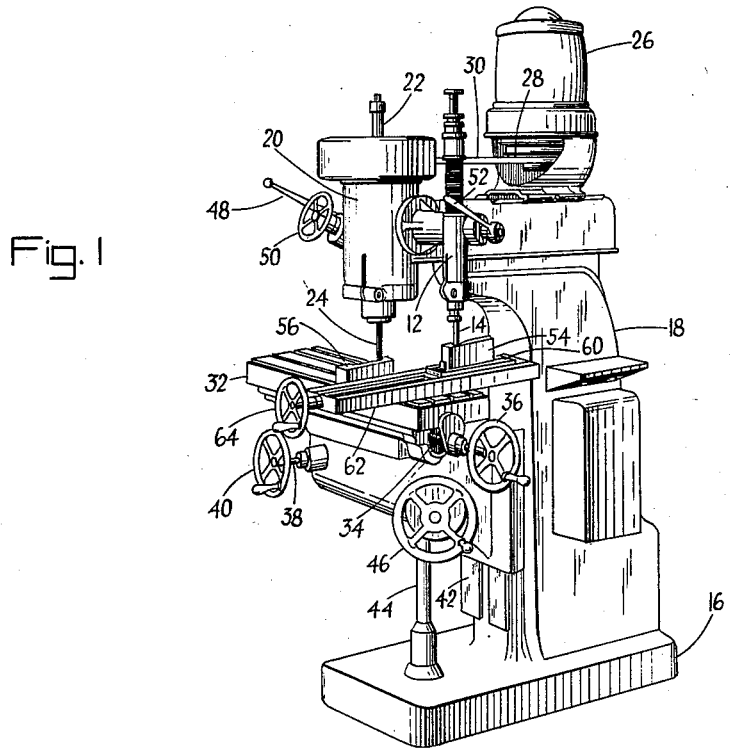
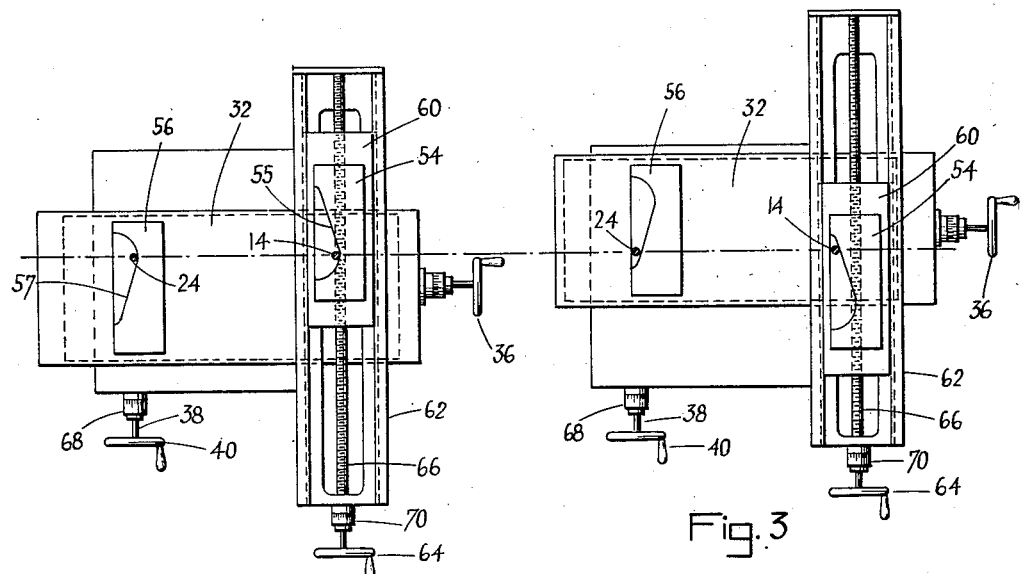
INVENTOR
ROBERT ROSSBACHER
BY James and Franklin
ATTORNEYS

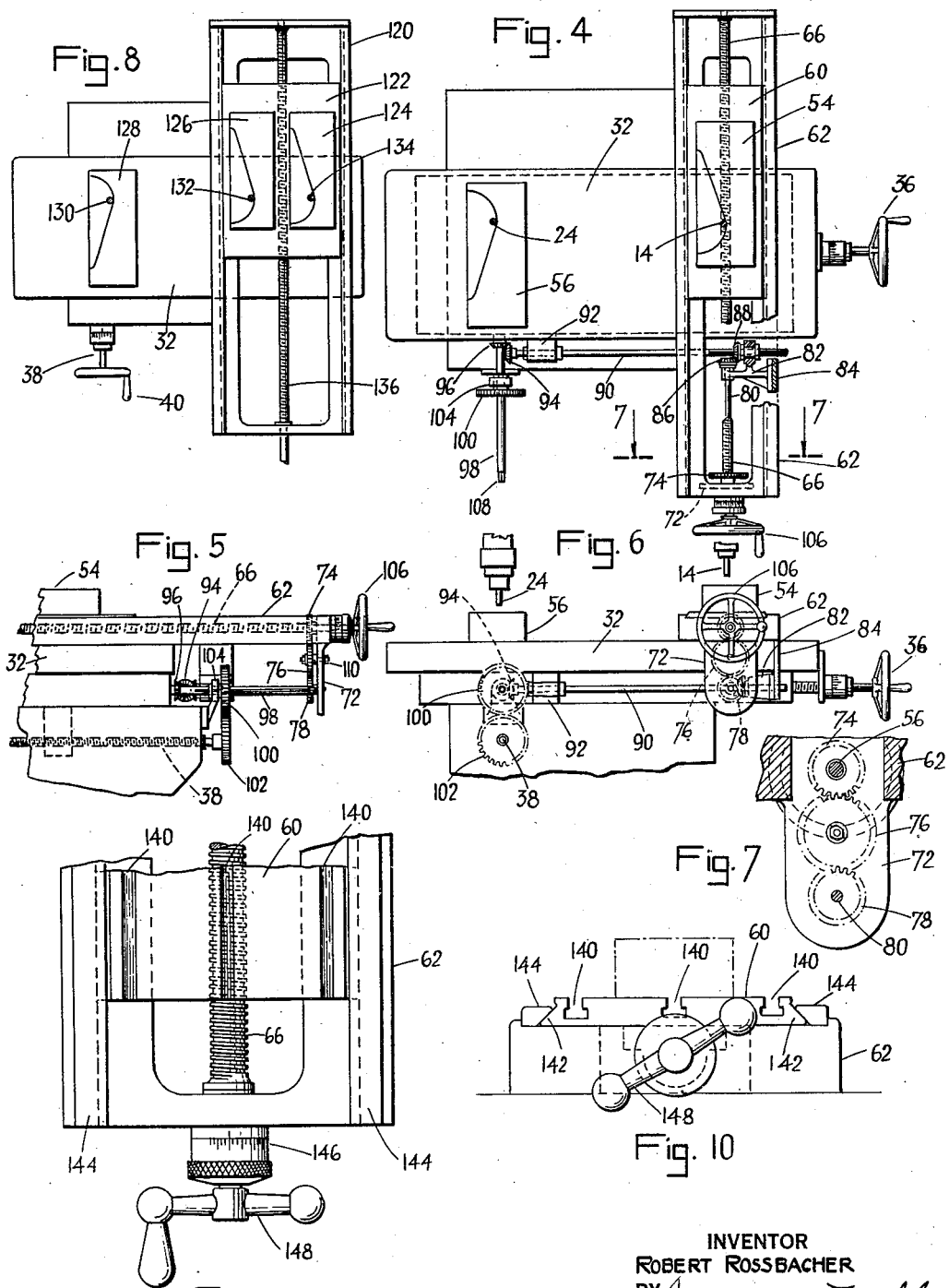

Patented Dec. 1, 1942

2,303,956

UNITED STATES PATENT OFFICE 2,303,956

APPARATUS FOR RIGHT- AND LEFT-HAND DUPLICATING

Robert Rossbacher, Toledo, Ohio, assignor to Doehler Die Casting Co., Toledo, Ohio, a corporation of New York Application July 17, 1941, Serial No. 402,757

22 Claims. (Cl. 90—13.1)

This invention relates to machine tools such as milling machines arranged to act as a duplicator, and more especially to act as a right and left-hand duplicator for symmetrical pairs.

Die impressions for die-casting or molding metal or plastics are usually cut into a solid block of steel, as by the use of small milling cutters or the like. A plaster impression of the mold may be made from a hand-made sample of the desired finished piece, and the steel die may then be cut by means of a so-called "duplicator" having a tracer which follows the plaster mold while the cutter works in the die. Often left and right-hand duplicates are needed, as for the door handles on an automobile, etc. These are not true duplicates, but are symmetrical pairs.

The primary object of the present invention is to generally improve duplicators. A more particular object is to provide a simple mechanism making it possible to produce both left and right-hand duplicates from a single model, that is, from either a left-hand or a right-hand model.

A more specific object of the invention is to provide a right-hand and left-hand duplicator which will be applicable to almost any vertical milling machine. For this purpose, the main work table which would ordinarily carry both the work and the model, is modified by providing the same with a model table having a feed screw of its own, so that the model may be moved in a direction opposite to the work in one axis, yet will be moved in the same direction as the work in the other two or coordinate axes.

In accordance with a further feature and object of the invention, the feed screw for the model table is preferably provided with a thread opposite in direction and double the pitch of the parallel feed screw for the main work table. In this way the work table and the model table may be simultaneously moved equally in opposite directions by simply rotating the parallel feed screws equally in the same direction. The parallel feed screws may be provided with micrometer scales for measurement of the desired equal movement.

In a modified form, the feed screws may be geared together for movement under a single control, and the provision of means for this purpose forms a further feature and object of the invention. In accordance with an ancillary object, this gearing may be made inoperative so that a true duplicate may be made from the model, as well as the reverse duplicate.

In accordance with still another object of the invention, the right and left-hand duplicates or dies may be made simultaneously from a single model, and with this object in view, the machine may be provided with an additional cutter spindle, and one of the two pieces of work is mounted on the model table, so that it moves with the model, while the other work piece moves in a direction opposite to the model.

To the accomplishment of the foregoing and such other objects as will hereinafter appear, my invention consists in the duplicator elements and their relation one to the other, as hereinafter are more particularly described in the specification and sought to be defined in the claims. The specification is accompanied by drawings, in which:

Fig. 1 is a perspective view showing an apparatus embodying features of my invention;

Figs. 2 and 3 are plan views schematically illustrating the invention, and showing the relative positions of the parts at two different phases in a duplicating operation;

Fig. 4 is a plan view showing how the apparatus may be modified for simultaneous opposite movement by means of a single control handle;

Fig. 5 is a fragmentary end view looking toward the left-hand end of Figs. 4 and 6;

Fig. 6 is a front elevation;

Fig. 7 is a section taken in the plane of the line 7—7 of Fig. 4;

Fig. 8 is a plan view showing still another modification of the invention for simultaneous production of both right and left-hand duplicates;

Fig. 9 is an enlarged plan view of one end of a basic unit; and

Fig. 10 is a front view of the same.

Referring to the drawings, and more particularly to Fig. 1, the invention is shown applied to a machine known commercially as a Gorton duplicator. Perhaps it is more accurate to speak of the invention as being applied to a vertical milling machine of a type forming a part of a Gorton duplicator, because when using the present invention the table and control lever of the Gorton duplicator is removed, this being readily and simply done. The machine then remaining is a simple vertical milling machine, except perhaps for the inclusion of the tracer head 12 for supporting a tracer 14. The Gorton machine is used and advertised for use as a vertical milling machine by removal of the table and control lever. It should be understood that my invention is applicable to almost any typical vertical milling machine, except that it may be necessary in some cases to provide a tracer head and tracer.

The machine comprises a base 16 with an upright column 18 carrying a head 20 for the milling machine spindle 22. This is adapted to receive any one of a number of suitable cutters 24. The cutter is driven by a suitable variable speed motor 26 having a stepped pulley 28 connected by means of a belt 30 to a mating step pulley on spindle 22.

The machine comprises a main work table 32 which may be moved longitudinally by means of a feed screw 34 turned by a handle 36. The work table may be moved transversely by means of a feed screw 38 and handle 40. This entire assembly may be moved vertically on ways 42 by means of a feed screw carried at post 44 and operated through appropriate gearing by means of a hand-wheel 46. The cutter 24 may also be moved vertically by means of a lever 48 or/and wheel 50, and the tracer 14 may be moved vertically by means of a lever 52, but these adjustments are used only to establish the desired initial relation, after which they are left fixed until the work is completed.

As so far described, the model or master 54 and the block of steel or stock 56 being cut might both be fixedly mounted on the main work table 32. The tracer 14 is smooth, but is selected to correspond in diameter and other dimensions to the cutter 24. It will be evident that by moving the main work table in an appropriate manner both longitudinally and transversely so as to bring the tracer 14 in contact with the model 54, the work 56 may be cut to duplicate the model.

One common mode of procedure is to make a sample of the ultimate product, say, an automobile door handle. This is then imbedded in plaster to produce a female or negative shape which, of course, is the shape of the mold required for die casting or molding the handle out of metal or plastic. The plaster mold is then used as a master or model for producing the desired steel mold, or for producing a more permanent metal master if many cavities are to be made. If left and right-hand duplicates were required, as for example, for the left and right-hand doors of an automobile, it was customary to make two hand-made samples of the handle, one for the right-hand door and the other for the left-hand door. From these, two plaster models would be made which, in turn, would serve for making the right and left-hand molds.

In accordance with the present invention, the machine is provided with a model table 60 which is slidably mounted for movement parallel to one of the directions of movement of the work table. In the present case the model table 60 is slidable in a guide track 62 which is fixedly mounted on the main work table 32, and which is provided with a feed screw of its own controlled by a handle 64. The track 62 and its feed screw are disposed parallel to the feed screw 38 which produces transverse movement of the work table 32.

With this arrangement the work 56 may be moved in one direction and the model 54 may be independently moved in the opposite direction. Both the model and the work will, however, be moved together by the handle 36 when the main work table is moved in longitudinal direction, and they will be moved together by the handle 46 when the main work table is moved vertically. Thus, the model and the work piece may be duplicated on two coordinate axes, but reversed as to only the third axis, and this is the necessary condition for producing symmetrical pairs or right and left-hand duplicates.

Thus, referring to Figs. 2 and 3, the model 54 is mounted on model table 60 which is slidable in guide 62 under the control of a handle 64 rotating a feed screw 66. The track 62 is fixedly mounted on the main work table 32, and the stock or work piece 56 is also fixedly mounted on the main work table 32. It will be understood that the conventional T slots are provided in work table 32 and model table 60 for clamping any desired work thereon, but these have been omitted to simplify the drawings. The work table 32 is moved longitudinally by means of handle 36. It is moved transversely by handle 40, while the model table 60 is moved in a parallel direction by means of the handle 64. The cutter is indicated at 24 and the tracer at 14. The shape of the die impression is indicated on the model 54 by the line 55, and on the work 56 by the line 57. The tracer 14 and the cutter spindle 24 maintain a fixed location and may be considered fixed points of reference. By comparison of Figs. 2 and 3, it will be seen that in moving the cutter from the wide to the narrow part of the mold impression, the work table 32 has been moved from left to right; that the model table 54 has been moved toward the operator, while the work table 32 has been equally and oppositely moved away from the operator. In this way, the impression in the work will be reversed relative to the model, thus producing a left-hand duplicate from a right-hand model, or vice versa.

Inasmuch as the entire model table assembly with its frame or guide 62 is mounted on the main work table 32, it partakes of all movement of the work table. Thus, the movement of the work table away from the operator in Fig. 3 carries the model table with it, and it is necessary for the operator to turn the feed screw 66 of the model table enough to compensate for the movement of the work table, and to then additionally add the desired opposite movement of the model table. Specifically, the movement of the model table, relative to the work table, should be twice the movement of the work table in order that its absolute movement in space or relative to the tracer may be equal and opposite to that of the work table.

To simplify the desired operation, and to avoid confusion, I make the thread on lead screw 66 opposite in direction and twice the pitch of the thread on the parallel feed screw 38 of the work table. With such an arrangement the desired result may be obtained by simply turning both handles 40 and 64 equally in the same direction. For additional convenience and accuracy, they are preferably provided with micrometer scales 68 and 70. With the screws properly related as here recommended, the micrometer scales may read alike. Inasmuch as it is customary for the feed screws of milling machines to be provided with micrometer scales, it is only necessary to add the micrometer scale 70, for the micrometer scale 68 forms a part of the milling machine itself.

It will be understood that to produce a true duplicate, it is merely necessary to omit using the feed handle 64. In other words, the model table 60 is appropriately centrally located with respect to the work table 32 and is then left in one position throughout the duplicating operation. In this way a right-hand mold may be produced from a right-hand model. By appropriately using the feed handle 64, the left-hand model may be produced from the same right-hand model. Thus, either a right or a left-hand model may be used for producing both right and left-hand dies for symmetrically paired products.

For still greater convenience the feed screws of the work table and the model table may be geared together for simultaneous operation by means of a single handle. Such an arrangement is illustrated in Figs. 4–7 of the drawings. These show the idea applied to the specific Gorton milling machine previously referred to, and for that reason suitable splined shafts have been provided to accommodate movement of the feed screw 66 of the model table, relative to the feed screw 38 of the main work table 32. Specifically, the forward end of track or guide 62 is provided with a depending bearing support and apron 72. The feed screw 66 has a gear 74 mounted at its forward end, this gear meshing with an idle gear 76 which, in turn, meshes with a gear 78. Gear 78 is carried at the forward end of a short shaft 80 (Figs. 4 and 7) which runs inwardly to a bearing bracket 82 (Figs. 4 and 6) preferably mounted on an arm 84 depending from the guide track 62. The inner end of shaft 80 carries a mitre gear 86 (Fig. 4) meshing with a mitre gear 88 which is slidably keyed on a shaft 90 extending along the forward edge of the main work table 32. The opposite end of shaft 90 extends through bearing 92 (Figs. 4 and 6) and carries a mitre gear 94 meshing with a mitre gear 96 mounted at the inner end of a shaft 98 projecting forwardly from the work table. Shaft 98 is keyed to but slidable through a gear 100 which, in turn, meshes with a gear 102 mounted at the outer end of the work table feed screw 38. The gear 100 has its hub grooved and so received in stationary bearing 104 (Fig. 5) that it is rotatable but cannot move axially and therefore remains in mesh with the gear 102.

It will be evident that with this arrangement, only a single feed handle need be used which, in the present case, is the handle 106 mounted at the forward end of the model table feed screw 66. The handle may, however, be mounted elsewhere as, for example, at the end of the shaft 98, this being appropriately squared or otherwise shaped at 108 to receive the handle 106.

In the present case the feed screw 66 is made opposite in direction and double the pitch of the feed screw 38, just as was previously described, and the gearing is accordingly so selected as to produce a one-to-one rotation of the feed screws in the same direction. It will be understood, however, that if desired the feed screw 66 may be given the same direction and the same pitch as the feed screw 38, the necessary differences being appropriately made up by corresponding changes in the gearing between the feed screws.

To make a left-hand mold from a right-hand model, it is simply necessary to operate the feed handles 36 and 106 until the desired shape has been reproduced. To make a right-hand mold from a right-hand model, it is necessary to disengage the gearing or to make the same inoperative. A special clutch may be provided for this purpose, but in the present case I have simply made the idle gear 76 readily removable from apron 72 by release of nut 110 (Fig. 5) holding the shaft of the idle gear on the apron. The handle 106 is then transferred to shaft 98, it being slipped over the square end 108 of shaft 98 for rotation of the lead screw 38.

It may not be amiss to mention that the gearing shown in Figs. 4–7 is complicated by two slidable shaft and gear connections solely because no change is being made in the specific milling machine shown in Fig. 1. This milling machine happens to be so constructed that the longitudinal feed wheel 36 is the final feed located nearest the work table, so that it moves with the work table, whereas the transverse feed wheel 40 is more remote and remains stationary. By redesigning the construction of the milling machine, or by selecting a milling machine in which the parallel feed screw for the work table is the final feed, mounted to move with the work table, the parallel feed screws may then be directly geared together in extremely simple fashion. Or from a different viewpoint, if the location of the tracer spindle relative to the cutter spindle is changed so as to make it possible for the guide track 62 to be located longitudinally of the work table 32, instead of transversely thereof, then both the feed wheels 36 and 64 would have parallel axes and would be immovable relative to each other and therefore could readily be geared together.

In Fig. 8, I show a very simple modification of the apparatus which makes it possible to produce both left and right-hand dies simultaneously from either a right or a left-hand model. For this purpose the guide track is widened, as indicated at 120, to slidably receive a widened table 122. This table acts as a combined model table and work table, it receiving a model 124 and a work piece 126. Another work piece 128 is mounted directly on the main work table 32. The cutter 130 corresponds to that previously described. The milling machine is modified to provide it with a duplicate or companion cutter spindle carrying a cutter 132. The tracer is indicated at 134.

The main work table 32 is moved vertically and longitudinally as previously described, and is moved transversely by a feed handle 40 turning a feed screw 38 just as previously described. The combined work and model table is moved by a feed screw 136, this preferably having the opposite direction and double pitch previously recommended. It may be provided with its own feed wheel and micrometer scale, as was described in connection with Figs. 2 and 3, or it may be geared to the feed screw 38, as was described in connection with Figs. 4–7. It will be evident that the work piece 126 will be cut to form a true duplicate of the model 124, while the work piece 128 will be cut to form a symmetrical pair.

Figs. 9 and 10 illustrate the model table 60 and guide track 62 to larger scale and in greater detail than in the other figures of the drawings. The model table 60 is provided with conventional T-slots 140 which facilitate clamping the model thereon. The edges of the model table are shaped at 142 to form a dovetail connection slidable in ways formed by the addition of suitable guide tracks 144. The micrometer scale 146 is also better shown in these figures. The control handle 148 is illustrated as a single handle, rather than a complete wheel, but this, of course, is an immaterial variation, as either type of handle may be employed.

It is believed that the construction, operation, and method of using my improved right and left-hand duplicator for symmetrical pairs, as well as the advantages thereof, will be apparent from the foregoing description. I am aware that elaborate, complex, and highly specialized machines have been designed which make it possible to reverse several directions of cutting relative to a tracer in order to obtain mating parts. However, the present improvement is a very simple attachment which may be made inexpensively, and may be used on an ordinary duplicator or vertical milling machine, for reversing the cut on only one axis.

It will be apparent that while I have shown and described my invention in several preferred forms, many changes and modifications may be made in the structures disclosed, without departing from the spirit of the invention, as sought to be defined in the following claims.

I claim:

1. A right and left-hand duplicator for symmetrical pairs, said duplicator comprising a cutter spindle, a tracer spindle, a main work table, conventional guides for the same, a model table movable on said main work table, accessory guides for the same, a first feed screw for said main work table, a second feed screw for said main work table, said second feed screw extending transversely of said first feed screw, and a third feed screw for said model table, said third feed screw extending parallel to said second feed screw, said parallel feed screws having micrometer scales for measuring the movement produced thereby, and said guides and feed screws being long enough for the main cutting movements, and said accessory guides and third feed screw being substantially longer than the main cutting movement in their direction.

2. A right and left-hand duplicator for symmetrical pairs, said duplicator comprising a cutter spindle, a tracer spindle, a main work table, a model table movable on said main work table, a first feed screw for said main work table, a second feed screw for said main work table, said second feed screw extending transversely of said first feed screw, a third feed screw for said model table, said third feed screw extending parallel to said second feed screw, the feed screw of said model table being opposite in direction from the parallel feed screw for the main work table, said parallel feed screws having micrometer scales for measuring the movement produced thereby.

3. A right and left-hand duplicator for symmetrical pairs, said duplicator comprising a cutter spindle, a tracer spindle, a main work table, a model table movable on said main work table, a first feed screw for said main work table, a second feed screw for said main work table, said second feed screw extending transversely of said first feed screw, a third feed screw for said model table, said third feed screw extending parallel to said second feed screw, the feed screw of said model table having twice the pitch of the parallel feed screw for the main work table, said parallel feed screws having micrometer scales for measuring the movement produced thereby.

4. A right and left-hand duplicator for symmetrical pairs, said duplicator comprising a cutter spindle, a tracer spindle, a main work table, a model table movable on said main work table, a first feed screw for said main work table, a second feed screw for said main work table, said second feed screw extending transversely of said first feed screw, a third feed screw for said model table, said third feed screw extending parallel to said second feed screw, the feed screw of said model table being opposite in direction and having twice the pitch of the parallel feed screw for the main work table.

5. A right and left-hand duplicator for symmetrical pairs, said duplicator comprising a cutter spindle, a tracer spindle, a main work table, a model table movable on said main work table, a first feed screw for said main work table, a second feed screw for said main work table, said second feed screw extending transversely of said first feed screw, a third feed screw for said model table, said third feed screw extending parallel to said second feed screw, the feed screw of said model table being opposite in direction and having twice the pitch of the parallel feed screw for the main work table, said parallel feed screws having micrometer scales for measuring the movement produced thereby.

6. A right and left-hand duplicator for symmetrical pairs, said duplicator comprising a vertical milling machine having a vertical spindle for a cutter and having a vertical tracer displaced from said spindle, a main horizontal work table for supporting the work at the cutter, conventional guides for the same, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, accessory guides for the same, a third horizontal feed screw parallel to one of the aforesaid feed screws for moving said model table, said parallel feed screws having micrometer scales for indicating the movement produced thereby, and said guides and feed screws being long enough for the main cutting movements, and said accessory guides and third feed screw being substantially longer than the conventional guides and feed screw parallel thereto.

7. A right and left-hand duplicator for symmetrical pairs, said duplicator comprising a vertical milling machine having a vertical spindle for a cutter and having a vertical tracer displaced from said spindle, a main horizontal work table for supporting the work at the cutter, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, a third horizontal feed screw parallel to one of the aforesaid feed screws for moving said model table, said last feed screw having a thread which is double the pitch of the parallel feed screw for the main work table, said parallel feed screws having micrometer scales for indicating the movement produced thereby.

8. A right and left-hand duplicator for symmetrical pairs, said duplicator comprising a vertical milling machine having a vertical spindle for a cutter and having a vertical tracer displaced from said spindle, a main horizontal work table for supporting the work at the cutter, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, a third horizontal feed screw parallel to one of the aforesaid feed screws for moving said model table, said last feed screw having a thread which is opposite in direction from the parallel feed screw for the main work table, said parallel feed screws having micrometer scales for indicating the movement produced thereby.

9. A right and left-hand duplicator for symmetrical pairs, said duplicator comprising a vertical milling machine having a vertical spindle for a cutter and having a vertical tracer displaced from said spindle, a main horizontal work table for supporting the work at the cutter, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, a third horizontal feed screw parallel to one of the aforesaid feed screws for moving said model table, said last feed screw having a thread which is opposite in direction and double the pitch of the parallel feed screw for the main work table.

10. A right and left-hand duplicator for symmetrical pairs, said duplicator comprising a vertical milling machine having a vertical spindle for a cutter and having a vertical tracer displaced from said spindle, a main horizontal work table for supporting the work at the cutter, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, a third horizontal feed screw parallel to one of the aforesaid feed screws for moving said model table, said last feed screw having a thread which is opposite in direction and double the pitch of the parallel feed screw for the main work table, said parallel feed screws having micrometer scales for indicating the movement produced thereby.

11. A right and left-hand duplicator for symmetrical pairs, said duplicator comprising a cutter spindle, a tracer spindle, a main work table, conventional guides for the same, a model table movable on said main work table, accessory guides for the same, a first feed screw for said main work table, a second feed screw for said work table, said second feed screw extending transversely of said first feed screw, a third feed screw for said model table, said third feed screw extending parallel to said second feed screw, and means so gearing the parallel feed screws together for simultaneous movement that the work table and model table are simultaneously moved equally in opposite directions relative to the cutter and tracer, and said guides and feed screws being long enough for the main cutting movements, and said accessory guides and third feed screw being substantially longer than the main cutting movement in their direction.

12. A right and left-hand duplicator for symmetrical pairs, said duplicator comprising a cutter spindle, a tracer spindle, a main work table, a model table movable on said main work table, a first feed screw for said main work table, a second feed screw for said work table, said second feed screw extending transversely of said first feed screw, a third feed screw for said model table, said third feed screw extending parallel to said second feed screw, the feed screw of said model table being opposite in direction and having twice the pitch of the parallel feed screw for the main work table, and means gearing the parallel feed screws together for simultaneous equal rotative movement, whereby the work table and model table are simultaneously moved equally in opposite directions relative to the cutter and tracer.

13. A right and left-hand duplicator for symmetrical pairs, said duplicator comprising a cutter spindle, a tracer spindle, a main work table, conventional guides for the same, a model table movable on said main work table, accessory guides for the same, a first feed screw for said main work table, a second feed screw for said work table, said second feed screw extending transversely of said first feed screw, a third feed screw for said model table, said third feed screw extending parallel to said second feed screw, means so gearing the parallel feed screws together for simultaneous rotative movement that the work table and model table are simultaneously moved equally in opposite directions relative to the cutter and tracer, and means whereby the gearing between said feed may be disconnected for true duplication, so that right and left-hand pieces both may be obtained from a single model, and said guides and feed screws being long enough for the main cutting movements, and said accessory guides and third feed screw being substantially longer than the conventional guides and feed screw parallel thereto.

14. A right and left-hand duplicator for symmetrical pairs, said duplicator comprising a vertical milling machine having a vertical spindle for a cutter and having a vertical tracer displaced from said spindle, a main horizontal work table for supporting the work at the cutter, conventional guides for the same, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, accessory guides for the same, a third horizontal feed screw parallel to one of the aforesaid feed screws for moving said model table, and means so gearing the parallel feed screws together for simultaneous rotative movement that the work table and model table are simultaneously moved equally in opposite directions relative to the cutter and tracer, and said guides and feed screws being long enough for the main cutting movements, and said accessory guides and third feed screw being substantially longer than the main cutting movement in their direction.

15. A right and left-hand duplicator for symmetrical pairs, said duplicator comprising a vertical milling machine having a vertical spindle for a cutter and having a vertical tracer displaced from said spindle, a main horizontal work table for supporting the work at the cutter, conventional guides for the same, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, accessory guides for the same, a third horizontal feed screw parallel to one of the aforesaid feed screws for moving said model table, means so gearing the parallel feed screws together for simultaneous rotative movement that the work table and model table are simultaneously moved equally in opposite directions relative to the cutter and tracer, and means whereby the gearing between said feeds may be disconnected for true duplication, so that right and left-hand pieces both may be obtained from a single model, and said guides and feed screws being long enough for the main cutting movements, and said accessory guides and third feed screw being substantially longer than the conventional guides and feed screw parallel thereto.

16. A right and left-hand duplicator for symmetrical pairs, said duplicator comprising a vertical milling machine having a vertical spindle for a cutter and having a vertical tracer displaced from said spindle, a main horizontal work table for supporting the work at the cutter, a first horizontal feed screw for feeding said table in one direction, a second horizontal feed screw for feeding said table in a transverse direction, said second feed screw extending transversely of said first feed screw, a model table horizontally slidably mounted on the main work table for holding a model at the tracer, a third horizontal feed screw parallel to one of the aforesaid feed screws for moving said model table, said last feed screw means having a thread which is opposite in direction and double the pitch of the parallel feed screw for the main work table, and means gearing the parallel feed screws together for simultaneous equal rotative movement, whereby the work table and model table are simultaneously moved equally in opposite directions relative to the cutter and tracer.

17. A right and left-hand duplicator for symmetrical pairs, said duplicator comprising two spaced cutter spindles, a tracer spindle, a main work table, conventional guides for the same, a combined work and model table movable on said main table, accessory guides for the same, a first feed screw for said main work table, a second feed screw for said main work table, said second feed screw extending transversely of said first feed screw, and a third feed screw for said combined work and model table, said third feed screw extending parallel to said second feed screw, and said guides and feed screws being long enough for the main cutting movements, and said accessory guides and third feed screw being substantially longer than the main cutting movement in their direction.

18. A right and left-hand duplicator for symmetrical pairs, said duplicator comprising two spaced cutter spindles, a tracer spindle, a main work table, conventional guides for the same, a combined work and model table movable on said main table, accessory guides for the same, a first feed screw for said main work table, a second feed screw for said main work table, said second feed screw extending transversely of said first feed screw, and a third feed screw for said combined work and model table, said third feed screw extending parallel to said second feed screw, said parallel feed screws having micrometer scales for measuring the movement produced thereby, and said guides and feed screws being long enough for the main cutting movements, and said accessory guides and third feed screw being substantially longer than the conventional guides and feed screw parallel thereto.

19. A right and left-hand duplicator for symmetrical pairs, said duplicator comprising two spaced cutter spindles, a tracer spindle, a main work table, a combined work and model table movable on said main table, a first feed screw for said main work table, a second feed screw for said main work table, said second feed screw extending transversely of said first feed screw, and a third feed screw for said combined work and model table, said third feed screw extending parallel to said second feed screw, the feed screw of said model table being opposite in direction and having twice the pitch of the parallel feed screw for the main work table.

20. A right and left-hand duplicator for symmetrical pairs, said duplicator comprising a vertical milling machine having two spaced vertical spindles for cutters and having a vertical tracer spaced from said spindles, a main horizontal work table for supporting one piece of work at one cutter, conventional guides for the same, a first horizontal feed screw for feeding said table in one direction, a second horizontal feed screw for feeding said table in a transverse direction, said second feed screw extending transversely of said first feed screw, a combined work and model table slidably mounted on the main work table for holding a model at the tracer and for holding a second piece of work at the second cutter, accessory guides for the same, a third horizontal feed screw parallel to one of the aforesaid feed screws for moving said combined work and model table, and said guides and feed screws being long enough for the main cutting movements, and said accessory guides and third feed screw being substantially longer than the main cutting movement in their direction.

21. A right and left-hand duplicator for symmetrical pairs, said duplicator comprising a vertical milling machine having two spaced vertical spindles for cutters and having a vertical tracer spaced from said spindles, a main horizontal work table for supporting one piece of work at one cutter, a first horizontal feed screw for feeding said table in one direction, a second horizontal feed screw for feeding said table in a transverse direction, said second feed screw extending transversely of said first feed screw, a combined work and model table slidably mounted on the main work table for holding a model at the tracer and for holding a second piece of work at the second cutter, a third horizontal feed screw parallel to one of the aforesaid feed screws for moving said combined work and model table, said last feed screw having a thread which is opposite in direction and double the pitch of the parallel feed screw for the main work table.

22. A right and left-hand duplicator for symmetrical pairs, said duplicator comprising a vertical milling machine having two spaced vertical spindles for cutters and having a vertical tracer spaced from said spindles, a main horizontal work table for supporting one piece of work at one cutter, conventional guides for the same, a first horizontal feed screw for feeding said table in one direction, a second horizontal feed screw for feeding said table in a transverse direction, said second feed screw extending transversely of said first feed screw, a combined work and model table slidably mounted on the main work table for holding a model at the tracer and for holding a second piece of work at the second cutter, accessory guides for the same, a third horizontal feed screw parallel to one of the aforesaid feed screws for moving said combined work and model table, said parallel feed screws having micrometer scales for indicating the movement produced thereby, and said guides and feed screws being long enough for the main cutting movements, and said accessory guides and third feed screw being substantially longer than the conventional guides and feed screw parallel thereto.

ROBERT ROSSBACHER.